United States Patent
Tamm et al.

(10) Patent No.: US 7,562,848 B2
(45) Date of Patent: Jul. 21, 2009

(54) SINGLE BOLT DEADEND ANCHOR CLAMP

(75) Inventors: Carl R. Tamm, Trussville, AL (US); Robert G. Hay, Pelham, AL (US)

(73) Assignee: Hubbell Incorporated, Orange, CT (US)

( * ) Notice: Subject to any disclaimer, the term of this patent is extended or adjusted under 35 U.S.C. 154(b) by 331 days.

(21) Appl. No.: 11/523,087

(22) Filed: Sep. 19, 2006

(65) Prior Publication Data
US 2007/0069092 A1   Mar. 29, 2007

Related U.S. Application Data

(60) Provisional application No. 60/720,654, filed on Sep. 27, 2005.

(51) Int. Cl.
*F16L 3/00* (2006.01)
(52) U.S. Cl. ............... 248/63; 24/65; 24/67.5
(58) Field of Classification Search ............ 248/231.31, 248/220.21, 220.22, 222.13, 228.2
See application file for complete search history.

(56) References Cited

U.S. PATENT DOCUMENTS

| | | | |
|---|---|---|---|
| 2,059,413 A | 11/1936 | Taylor | |
| 2,196,938 A | 4/1940 | Parnell | |
| 2,867,874 A * | 1/1959 | Larson | 24/115 K |
| 2,884,476 A | 4/1959 | Lock et al. | |
| 3,274,654 A * | 9/1966 | Becker | 403/287 |
| 3,470,528 A | 9/1969 | Farrington, Jr. et al. | |
| 3,623,687 A | 11/1971 | Nordstrom | |
| 4,183,686 A * | 1/1980 | De France | 403/11 |
| 4,383,668 A * | 5/1983 | Hall | 248/63 |
| 4,969,616 A * | 11/1990 | Apperson et al. | 248/63 |
| 5,539,961 A | 7/1996 | De France | |
| 5,752,680 A * | 5/1998 | Mann | 248/63 |
| 7,039,988 B2 * | 5/2006 | De France | 24/136 R |
| 2005/0015940 A1 | 1/2005 | Stafford | |
| 2005/0066482 A1 | 3/2005 | De France | |

FOREIGN PATENT DOCUMENTS

JP    2-307322    12/1990

* cited by examiner

*Primary Examiner*—J. Allen Shriver, II
*Assistant Examiner*—Alaeddin Mohseni
(74) *Attorney, Agent, or Firm*—Jenae C. Gureff; Mark S. Bicks; Alfred N. Goodman

(57) ABSTRACT

A single bolt deadend anchor clamp for gripping a cable includes a body having a clevis assembly at a first end and a sagging eye at an opposing second end. A middle body extends between the first and second ends, and includes a reinforcing rib. A pocket is adjacent the reinforcing rib for receiving a keeper inserted above the pocket. A biasing member is disposed between the pocket and the keeper for counterbalancing a load between the keeper and the retaining groove. The biasing member is preferably a spring including a cross bar and two sets of coils.

14 Claims, 4 Drawing Sheets

SINGLE BOLT DEADEND ANCHOR CLAMP

CROSS REFERENCE TO RELATED APPLICATIONS

This application claims the benefit of U.S. Provisional Application 60/720,654, filed Sep. 27, 2005. That application is hereby incorporated by reference in its entirety.

FIELD OF THE INVENTION

The present invention relates to a single bolt deadend anchor clamp designed to initiate a dynamic clamping action. More particularly, the invention relates to a wedge clamp comprising a body having a clevis assembly and a socket opposite one another, a middle body having a retaining groove for cable insertion, a pocket, a keeper, and a spring for counterbalancing a load between the keeper and the retaining groove.

BACKGROUND OF THE INVENTION

Conventional deadend anchor clamps are commonly used to secure a cable under tension, for example, an overhead electrical conductor. A deadend anchor clamp typically utilizes one or more U-bolts to clamp a keeper, which in turn applies a clamping pressure to the conductor. One drawback of conventional deadend anchor clamps is that a lineman must remove a plurality of nuts and washers. Then, the clamp is reassembled after the conductor has been introduced within the cable groove and tightened to secure the conductor. As this operation is typically completed on energized lines, handling a plurality of small components with gloves or tools, while balancing on an aerial platform is difficult.

One type of deadend anchor clamp utilizes a plurality of sliding wedges which are held in contact with the conductor. A problem with the wedge clamps is that clamping is dependent upon dynamic actuation. As a result, the wedge clamps are limited to fairly high conductor tension applications, where the tension should not reach above a zero or negative tension value, because the wedge members may release and the conductor may fall. Additionally, wedge clamps are typically expensive to manufacture.

Yet another type of deadend anchor clamp is a side opening type deadend anchor clamp. The side opening deadend anchor clamp is typically used to address the problem of removing U-bolts, nuts, and washers. Side opening deadend anchor clamps utilize at least one guide member against which the keeper and U-bolt assembly are positioned. The guide member provides an opening to the retaining groove through which the conductor may be introduced in the radial direction. The clamps also utilize a clamp having a pair of legs, terminating in a clevis. While the clevis may be removed to allow the conductor to be introduced between the legs, this operation typically is performed with the cable present. Further, the installer typically tightens the U-bolt bolts in a sequential manner to provide the maximum clamping force. Failure to do so may result in reduced clamping force or cable slippage. Cable slippage may result in increased sag of the energized lines, causing a number of potentially dangerous situations.

Another type of clamp embodies a body having a cable receiving groove and a keeper where multiple bolts are used to connect the keeper to the body, as seen in U.S. Pat. No. 4,383,668 to Hall.

Other related conventional clamps are described in the following documents whose entire disclosures are hereby incorporated by reference: U.S. Patent Publication/Patent Nos. 2005/0066482 to De France; 2005/0015940 to Stafford; U.S. Pat. No. 5,752,680 to Mann; U.S. Pat. No. 5,539,961 to De France; U.S. Pat. No. 4,969,616 to Apperson et al.; U.S. Pat. No. 4,383,668 to Hall; U.S. Pat. No. 3,623,687 to Nordstrom; U.S. Pat. No. 3,470,528 to Farrington, Jr. et al.; U.S. Pat. No. 2,884,476 to Lock et al.; U.S. Pat. No. 2,196,938 to Parnell; U.S. Pat. No. 2,059,413 to Taylor; and Japanese Patent No. 2-307322.

Accordingly, a need exists for providing a unique and improved cable clamp with a single bolt for initiating dynamic clamping action.

SUMMARY OF THE INVENTION

Accordingly, an object of the invention is to provide an anchor clamp assembly such as a single bolt deadend anchor clamp for initiating dynamic clamping action.

Another object is to provide an anchor clamp having a spring nested within a pocket of the anchor clamp for biasing a keeper against guide supports of the pocket.

A further object is to provide a single bolt for positioning the keeper and bias the keeper into intimate contact with a cable, forcing the cable into a unique retaining groove.

Yet another object is to provide a bolt threaded into the middle section of the anchor clamp to couple the keeper and position it against the body.

Still another object is to provide an anchor clamp having a substantially U-shaped object disposed at its first end for pivotal connection to a supporting structure.

The foregoing objects are basically attained by providing an anchor clamp assembly comprising a body having a clevis assembly at a first end and a sagging eye at an opposing end, a retaining groove, a pocket for receiving a keeper, and a biasing member received in the pocket and keeper.

By forming the anchor clamp in this manner, end users can counterbalance a load between the keeper and the retaining groove. The bolt and keeper are biased toward an anchor/relief end so when the bolt is tightened, the keeper comes into contact with the cable in this biased location.

As used in this application, the terms "top", "bottom", and "side" are intended to facilitate the description of the anchor clamp, are merely illustrative of the anchor clamp and are not intended to limit the anchor clamp of the present invention to any particular orientation.

Other objects, advantages, and salient features of the present invention will become apparent from the following detailed description, which, taken in conjunction with the annexed drawings, disclose a preferred embodiment of the present invention.

BRIEF DESCRIPTION THE DRAWINGS

Referring to the drawings which form a part of this disclosure:

DETAILED DESCRIPTION OF THE INVENTION

Figure 1:
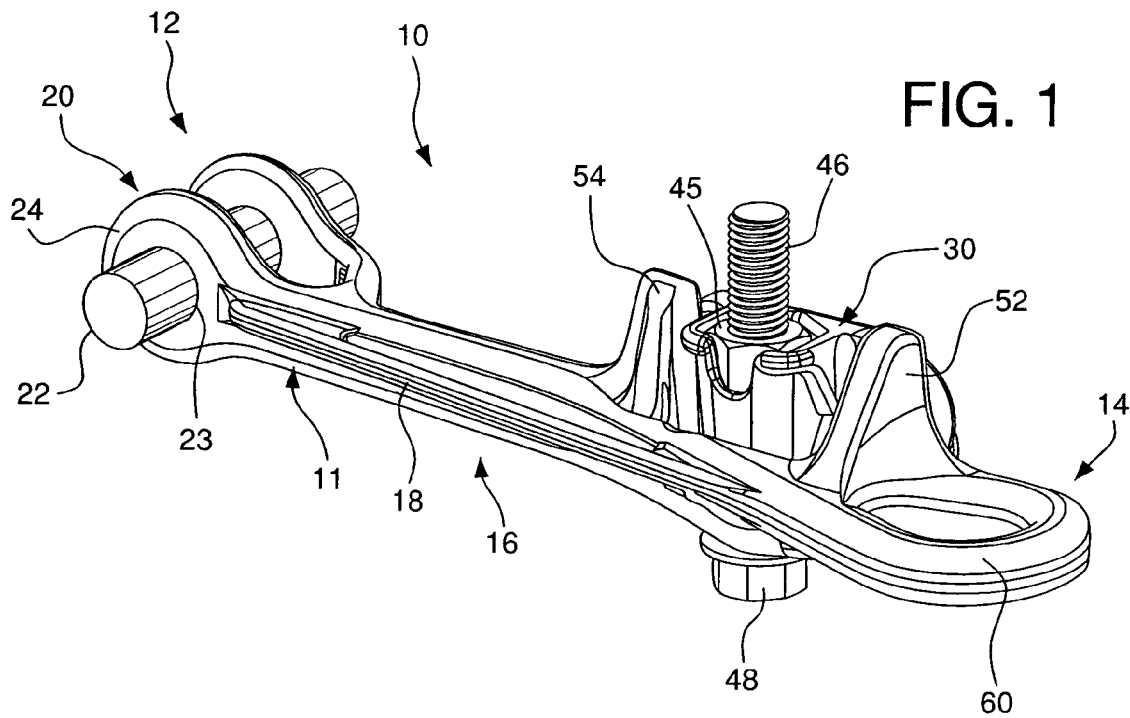
FIG. 1 is a rear perspective view of the single bolt deadend anchor clamp according to an embodiment of the present invention.

As seen in FIGS. 1-7, an anchor clamp 10 is illustrated for securing a cable. The anchor clamp 10 includes a main body 11 having a first end 12, a second end 14, a keeper 30 received in a pocket 50, and a biasing member 70 for counterbalancing a load between the keeper 30 and the retaining groove 26. A single bolt 46 received by the keeper 30 to attach the keeper 30 to the main body 11. The pocket 50 initiates a dynamic clamping action between the keeper 30 and the pocket 50 with the assistance of a biasing member 70 therebetween.

The anchor clamp 10 comprises a main body 11 defined by first end 12, opposing second end 14, and a middle section 16 extending therebetween. The first end 12 includes a clevis assembly 20 with a pin 22 threaded through coaxially aligned openings in a clevis bracket 24. The bracket 24 is substantially U-shaped for pivotal connection to a supporting structure (not shown). Each side of the bracket 24 is defined by a substantially circular shaped opening 23 for receiving the pin 22. The pin 22 provides the main connection to the supporting structure and prevents the anchor clamp 10 from disengaging from the supporting structure.

Second end 14 adjacent to the middle section 16 includes a sagging eye 60. The sagging eye 60 is a substantially oval shaped opening that defines the end 14 of the clamp. This feature enables a lineman to better handle the clamp 10.

Figure 2:
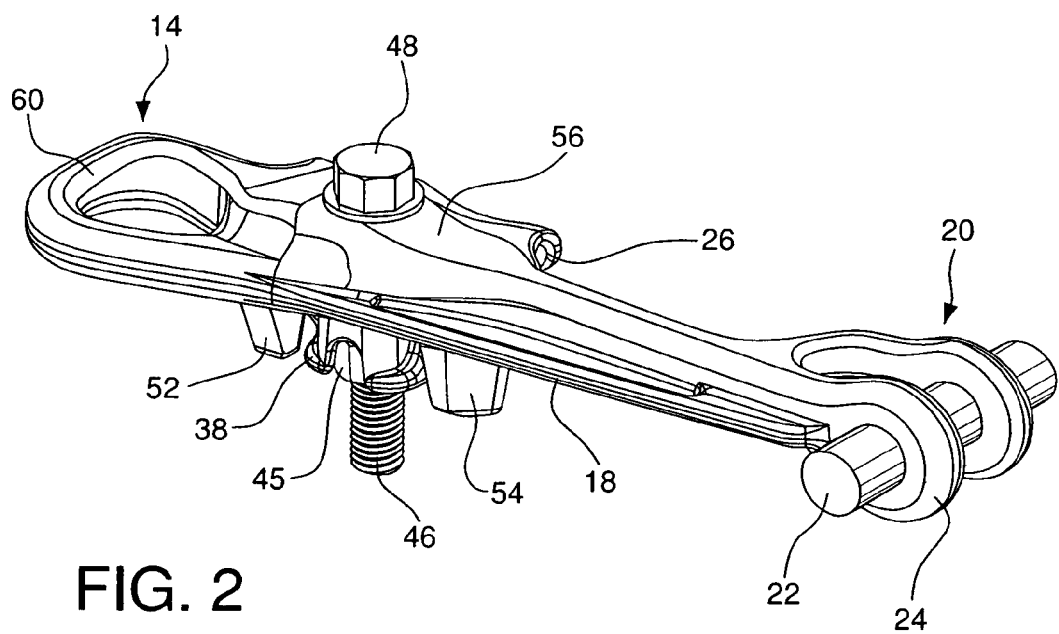
FIG. 2 is a front perspective view of the single bolt deadend anchor clamp of FIG. 1 with the body flipped around.
Figure 3:
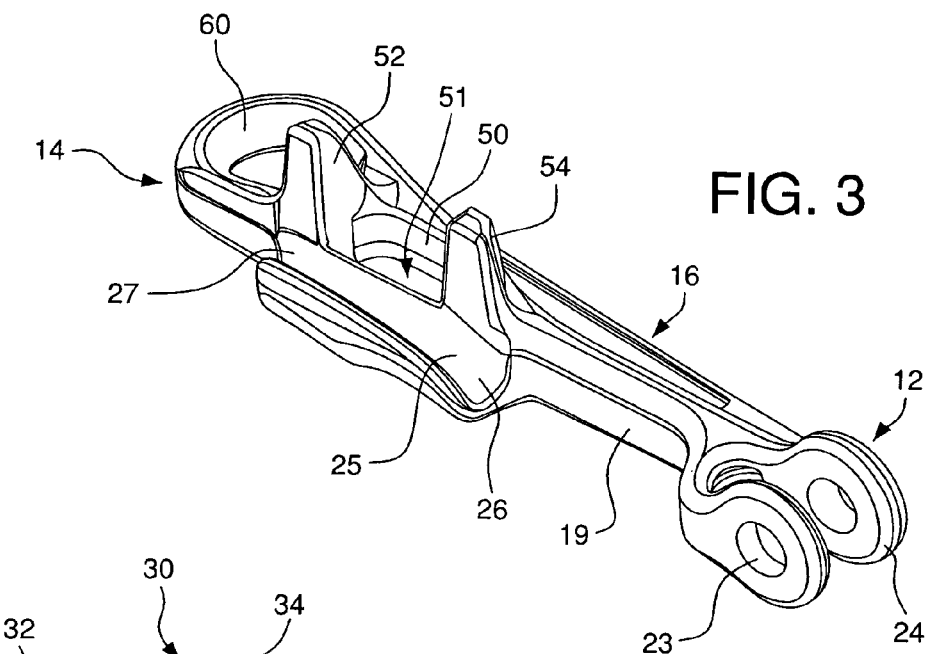
FIG. 3 is a front perspective view of the single bolt deadend anchor clamp of FIG. 1 with the keeper removed from the pocket and a detached clevis assembly.

Turning to FIGS. 2-3, the middle section 16 includes a reinforcing rib 18 extending between first end 12 and second end 14 and a retaining groove 26. The reinforcing rib 18 is a single leg support member that extends laterally between the middle section 16 and the clevis bracket 24. The anchor clamp 10 uses a single leg support structure to improve access for inserting a cable into the retaining groove 26 and urging the cable around a clevis attachment point, such as the pin 22. The retaining groove 26 forms a curved or substantially V-shaped surface beneath the keeper 30 to support a cable and couple the cable to the underside of the keeper 30. The retaining groove 26 may be defined by gripping features to further secure the cable and prevent it from slipping through the retaining groove 26.

The retaining groove 26 includes an introduction groove 25 which is preferably larger in radius and positioned below the normal centerline of the cable. The retaining groove 26 may transition into a substantially curved surface 27 at the opposite end of the retaining groove 26. Further, the retaining groove 26 may be positioned so that dynamic tension on the cable forces the cable into ever increasing contact with the curved surface 26. The cable bearing surface 40 of the keeper 30 is arranged opposite the retaining groove 26 to ensure the gripping occurs on the contact area of the relief end of the cable.

As seen in FIG. 3, the middle section 16 further includes the pocket 50 adjacent retaining groove 26. Pocket 50 is a shallow cavity configured to receive the keeper 30 (FIG. 4) with a biasing member 70 (FIG. 7) therebetween. The cavity 51 is defined by two supports 52, 54 adjacent pocket 50, one on each end. Support 54 is closer to the first end 12, and support 52 is closer to the second end 14. A threaded bolt 46 is received through the pocket 50 (in between the supports 52, 54) and through the keeper 30 to retain the keeper 30 adjacent the retaining groove 26.

Figure 4:
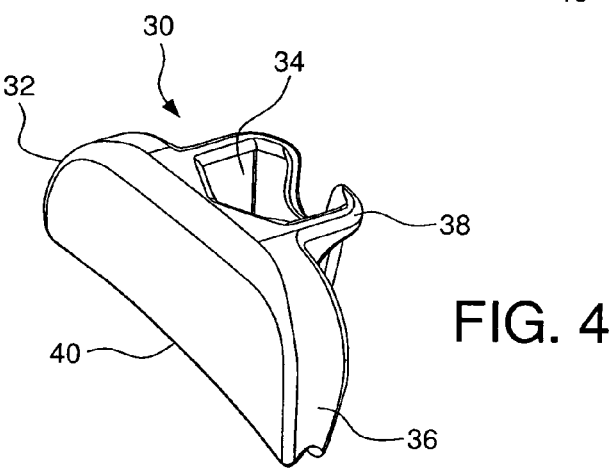
FIG. 4 is a side perspective view of the keeper of the single bolt deadend anchor clamp of FIG. 1.
Figure 5:
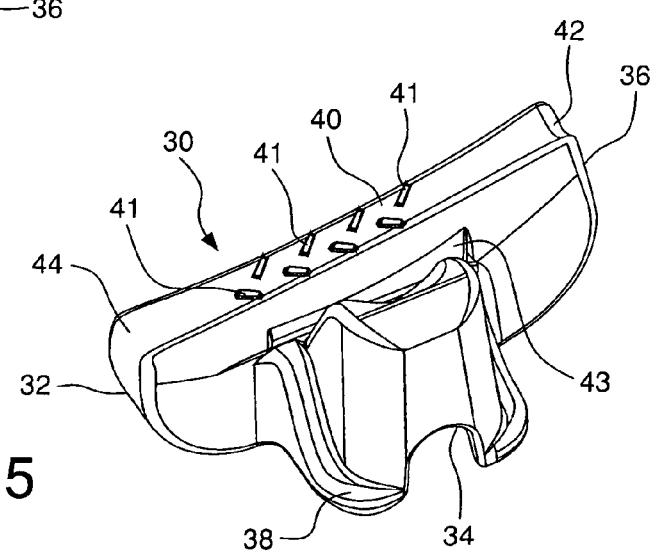
FIG. 5 is a bottom perspective view of the keeper in FIG. 4.
Figure 6:
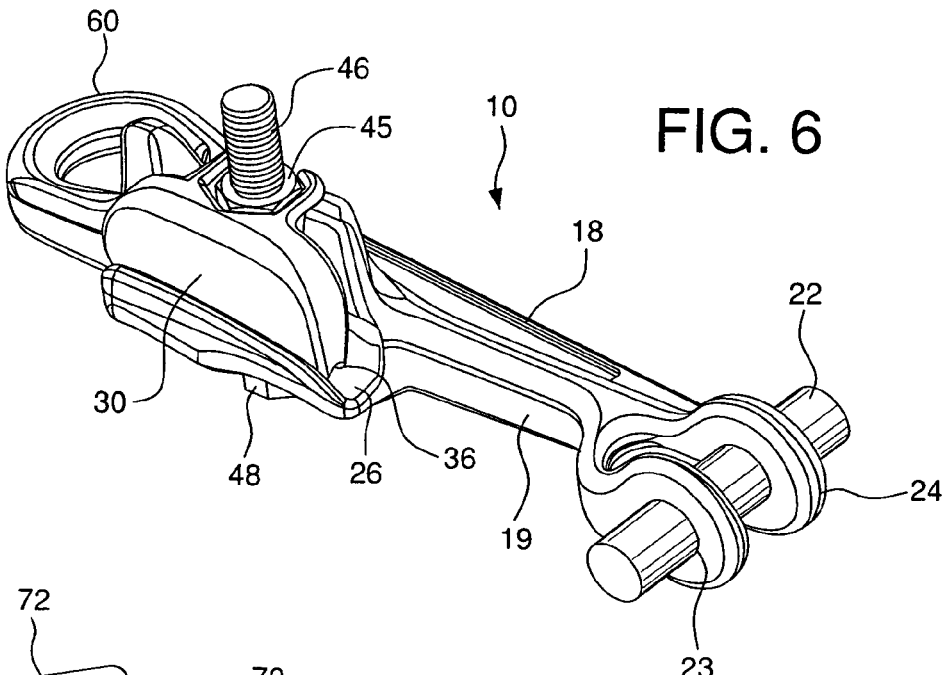
FIG. 6 is a front perspective view of the single bolt deadend anchor clamp of FIGS. 1-3, with the bolt and keeper biased toward an anchor/relief end.

The keeper 30, shown in detail in FIGS. 4 and 5, attaches to the upper side of the clamp 10 above the retaining groove 26 and is received by the pocket 50. When the keeper 30 is received in the pocket 50, a cable bearing surface 40 on the keeper 30 forms a substantially V-shaped curved surface opposite the curved surface of the retaining groove 26. The cable bearing surface 40 includes a plurality of teeth 41, disposed at an angle of 30-60° from the cable axis, aligned to facilitate gripping of the cable and to prevent the cable from quickly sliding off the retaining groove 26.

The gripping features provided on the surface of the retaining groove 26 and the cable bearing surface 40 engage the cable to prevent slippage. As tension is applied and the cable creeps forward, the gripping features or teeth 41 are angled and positioned so that the cable is forced further into the hyperbolic surface of the retaining groove 26. The cable bearing surface 40 includes a substantially V-shaped configuration 42 at the rear end 36 and a radial curve 44 towards the front end 32. The retaining groove 26 and the V-shaped configuration 42 of the cable bearing surface 40 are acutely angled towards each other to receive a cable. Tension is applied on the cable in the direction of the front end 32, towards the radial curve 44, and against the downward slope of the retaining groove 26. The teeth 41 preferably point towards the same direction of the cable bearing surface 40.

As best seen in FIG. 4, the keeper 30 includes an opening or nested surface 34 for receiving a nut 45. The nested surface 34 is disposed in the middle of the keeper 30, between the keeper's front end 32 and rear end 36, extending away from the cable bearing surface 40. A flange 38 extends along the outer ridge of the nested surface 34 for improving the structural integrity about the nested surface 34. A bolt 46 passes through the pocket 50 and the keeper 30, connecting the two pieces. Preferably, only one bolt is required for connecting the pocket 50 and the keeper 30.

To secure the bolt 46, a nut 45 is installed in the nested surface 34 and rotated onto the externally threaded surface of the bolt 46. The nested surface 34 comprises an edge with angularly oriented planar surfaces for receiving a nut 45. This relationship will be discussed in further detail below.

The bolt 46 positions the keeper 30 and forces the keeper 30 into intimate contact with a cable, in conjunction with a biasing member or spring 70. On the opposite side of the keeper 30, shown in FIG. 5, a notch 43 is disposed between the bottom of the nested surface 34 and the cable bearing surface 40. The notch 43 receives the biasing member 70 for counterbalancing a load. Thus, the cable is forced into the retaining groove 26.

Figure 8:
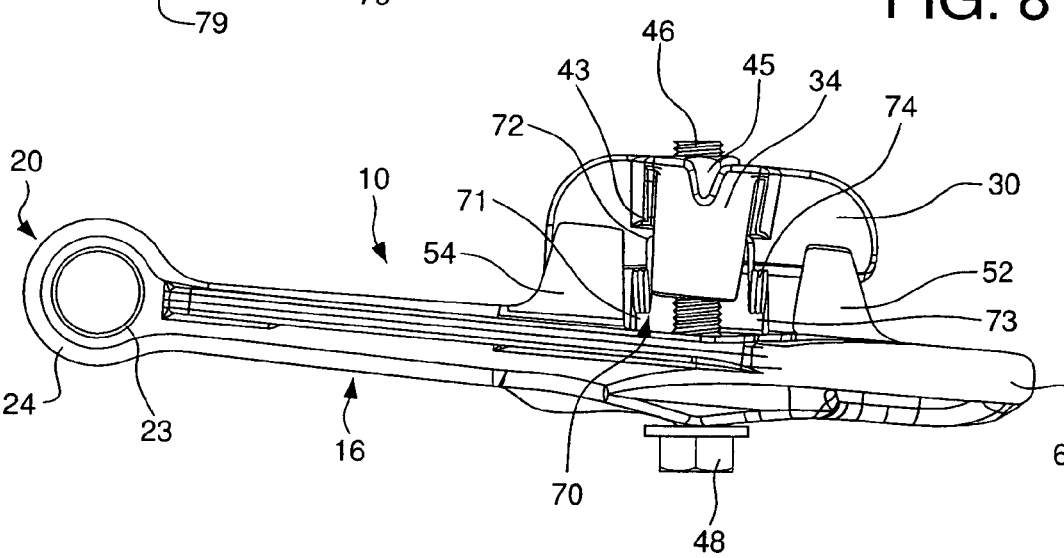
FIG. 8 is a side elevational view of the single bolt deadend anchor clamp of FIG. 1 and the biasing member of FIG. 7 in an installation position.

As seen in FIG. 8, the keeper 30 is attached to the clamp 10 with a single bolt 46 fastening member threaded into the clamp 10 and with a biasing member 70 for counterbalancing the keeper 30 against the main body 11 of the clamp 10. Thus, when the bolt 46 is tightened, the keeper 30 moves into contact with the cable against the bias of the spring member 70. The components supporting the bolt 46 are configured to allow the keeper 30, initially clamped down onto the cable in a rearward position toward the anchor/relief end, to rock forward with the cable when sufficient tension is applied. Consequently, the keeper 30 moves toward the cable, increasing the pressure on the cable in a direction towards the retaining groove 26 as increased tension is applied to the cable.

Figure 9:
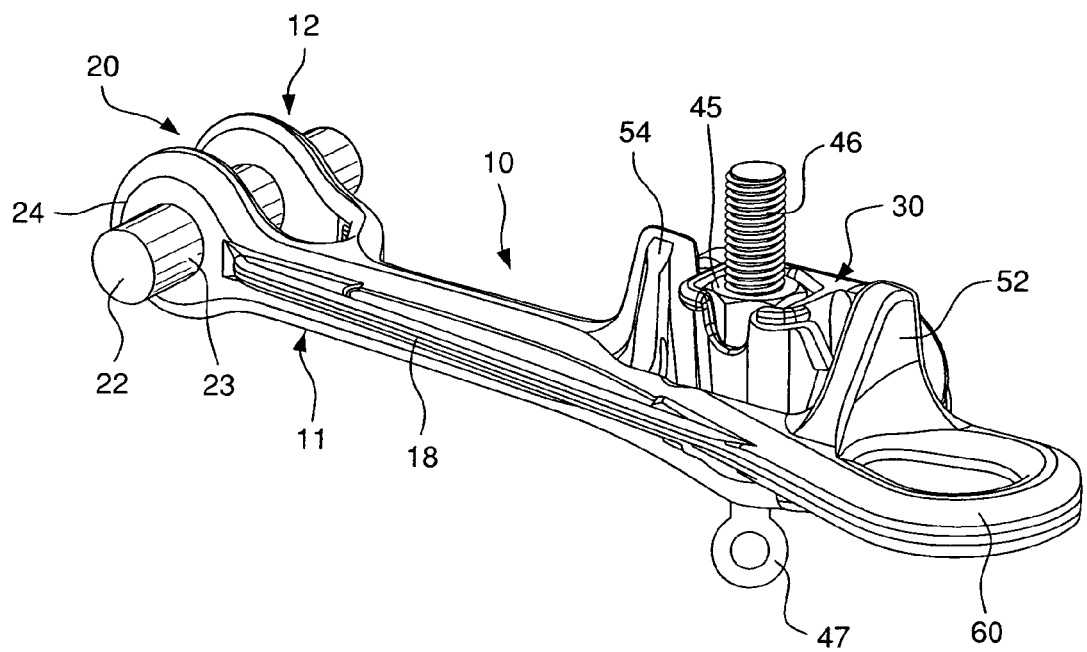
FIG. 9 is a rear perspective view of the single bolt deadend anchor having a bolt with an eye as opposed to a head according to the present invention illustrated in FIG. 1.

The bolt 46 is disposed adjacent the biasing member 70. It is received by an opening in the keeper 30 and a corresponding opening in the pocket 50. The pocket 50 also receives the ends 79 of the biasing member 70. The bolt 46 is typically provided with a common hex head 48, a six-sided surface, opposite the side of the bolt 46 that receives a nut 45; however, the bolt 46 may also be provided with an eye 47, as seen in FIG. 9, or any other suitable design. The nut 45 is positioned in the nested surface 34 as the externally threaded bolt 46 rotates about a longitudinal axis for securing the bolt 46 to the keeper 30 and pocket 50. For example, the eye can facilitate attachment of a specialty tool used for installation such as a hot stick.

Figure 7:
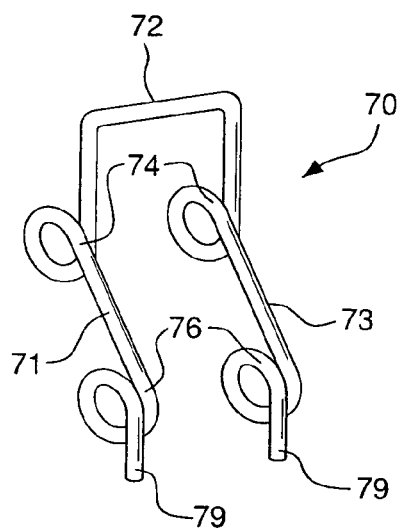
FIG. 7 is a side perspective view of the biasing member according to the present invention illustrated in FIG. 1.

The biasing member 70 can be any suitable element for counterbalancing or lifting the necessary load. For example, a quad helix double torsion spring 70, as shown in FIG. 7, may be used as a biasing member 70. The spring 70 counterbalances a load of between about one and eight pounds and is constructed from about 0.064" spring wire and 17-7PH stainless steel. The spring 70 is preferably restrained in the pocket 50 which receives the free ends 79 and provides a wall to restrict the forward motion of the "knee" and to retain them laterally. The "knee" or lower coil 76 only flexes about 10-15° counterclockwise or in the normal position.

The spring 70 includes two legs 71, 73 connected by a cross bar 72 or bail which fits into the notch 43 of the keeper 30. The bottom two ends 79 of legs 71, 73 are received in the pocket 50. The legs 71, 73 each include an upper coil 74 and a lower coil 76. The first or lowermost pair of coils 74 serves to bias the spring 70 and the keeper 30 against the supports 52, 54 on the body 10. The second or upper coils 76 provide the lifting action over the retaining groove 26. The cross bar 72 or bail rests in the notch 43 of the keeper 30 to allow the freedom of rotation of the spring 70 in the notch 43. The keeper 30 will be maintained in the planar position, and slide within the confines of the plane while clamping down against the bias of the spring 70.

The spring 70 of the exemplary embodiment biases the keeper 30 upwardly away from the retaining groove 26 and against the support members 52, 54 to maintain alignment between the keeper 30 and retaining groove 26 while a cable is inserted. The second set of torsion helix coils 76 provides the force to bias the keeper 30 in the open position to accept a cable, and allow the keeper 30 to slide in a planar fashion against the support members. Once the cable is inserted, the bolt 46 is rotated into the nut 45 and tightened to force the keeper 30 closer to the main body 11. The keeper 30 clamps down against the bias of the spring to retain the cable between the cable bearing surface 40 and the retaining groove 26. When the spring 70 is in place and the keeper 30 is positioned against the supports 50, 52, the keeper 30 can only move translationally. Therefore, it only moves parallel to the longitudinal axis.

When installing conventional anchor clamps with hot sticks, a tool commonly used by linemen for maintenance on energized conductors, a second person and hot stick may be required to push a keeper back into alignment, while the first person tightens the nuts in alternating fashion. Consequently, the spring 70 maintains the relationship of the keeper 30 to the rearmost or introduction portion of the retaining groove 26 along the direction of the cable axis.

The final assembly procedure in the factory is to peen the threads on the bolt 46 to assure the nut 45 cannot disengage from the bolt 46. Therefore, the captive hardware of the assembly is maintained as an integral unit and the lineman has a reduced number of parts to drop or lose. The single bolt deadend anchor clamp 10 also simplifies installation as there is no sequence required to tighten or loosen a plurality of fasteners.

While a particular embodiment has been chosen to illustrate the invention, it will be understood by those skilled in the art that various changes and modifications can be made therein without departing from the scope of the invention as defined in the appended claims.

What is claimed is:

1. A wedge clamp comprising:
   a body having a clevis assembly at a first end and an eye at an opposing second end;
   a middle body extending between said first and second ends, including a reinforcing rib protruding laterally from said middle body extending continuously and longitudinally from said clevis to said eye;
   a pocket in said body adjacent but laterally spaced from said reinforcing rib receiving a keeper inserted above said pocket, said pocket being a shallow cavity with first and second supports on opposite ends of said pocket,
   said keeper including a nested surface facing a middle of said keeper and being received between first and second supports, said nested surface having an edge with angularly oriented planar surfaces for receiving a nut;
   a retaining groove having a substantially V-shaped surface disposed adjacent said pocket corresponding to a bottom surface of said keeper; and
   a biasing member disposed between said pocket and said keeper for counterbalancing a load between said keeper and said retaining groove.

2. A wedge clamp according to claim 1 wherein
   said clevis assembly further includes a bracket having first and second openings; and
   a pin extending through said openings.

3. A wedge clamp according to claim 1 wherein
   said eye comprises a substantially oval shaped opening.

4. A wedge clamp according to claim 1 wherein
   a bolt connecting said keeper to said pocket and securing said keeper adjacent a retaining groove on said middle body adjacent said supports.

5. A wedge clamp according to claim 1 wherein
   a bolt extends through said pocket and said keeper adapted to secure said keeper to said body; and
   a nut received in said nested surface engages a threaded external surface of said bolt.

6. A wedge clamp according to claim 4 wherein
   said retaining groove comprises a substantially curved surface opposite a cable bearing surface of said keeper with said cable bearing surface forming a substantially V-shaped surface facing away from a nested surface towards the middle of said keeper.

7. A wedge clamp according to claim 6 wherein
   said cable bearing surface includes a plurality of gripping members angled and positioned away from said retaining groove.

8. A wedge clamp according to claim 1 wherein
   said biasing member is a spring.

9. A wedge clamp comprsing:
   a body having a clevis assembly at a first end and an eye at an opposing second end;
   a middle body extending between said first and second ends, including a reinforcing rib protruding laterally from said middle body extending continuously and longitudinally from said clevis to said eye;
   a pocket in said body adjacent but laterally spaced from said reinforcing rib receiving a keener inserted above said pocket;

a retaining groove having a substantially V-shaped surface disposed adjacent said pocket corresponding to a bottom surface of said keeper;

a biasing member disposed between said pocket and said keeper for counterbalancing a load between said keeper and said retaining groove, said biasing member being a double torsion spring including a cross bar connecting first and second legs of said spring; and an upper coil and a lower coil disposed are on first and second legs, said lower coils biasing said keeper against first and second supports adjacent said pocket and said upper coils elevating said keeper over said retaining groove.

10. A wedge clamp according to claim 9 wherein said cross bar restrained in a notch of said keeper, said notch extending below a nested surface of said keeper.

11. A wedge clamp comprising:

a body having a clevis assembly at a first end including a bracket with first and second openings and a pin extending through said openings, and an eye defined by a substantially oval shaped opening disposed opposite said clevis assembly;

a middle body having a reinforcing rib protruding laterally from said middle body extending continuously and longitudinally between said clevis assembly and said eye;

a pocket disposed in said body adjacent but laterally spaced from said reinforcing rib extending between a first and second support for receiving a keeper between said keeper and said pocket, said keeper including a nested surface facing a middle of said keeper;

a biasing member disposed between said pocket and said keeper for counterbalancing a load between said retaining groove and said keeper, said biasing member being a double torsion spring including a bar connecting first and second legs of said spring restrained in a notch of said keeper extending below said nested surface;

an upper coil and a lower coil disposed on first and second legs, said lower coil biasing said keeper against first and second supports adjacent said pocket and said upper coils elevating said keeper over said retaining groove; and a bolt connecting said keeper to said pocket and securing said keeper against a retaining groove on said middle body adjacent said supports for receiving a cable.

12. A wedge clamp according to claim 11 wherein a retaining groove adjacent said pocket for supporting a cable comprises a substantially V-shaped disposed adjacent said pocket corresponding to a bottom surface of said keeper.

13. A wedge clamp according to claim 11 wherein said reinforcing rib is a single leg support member extending between said middle body and said clevis bracket.

14. A wedge clamp according to claim 11 wherein said bolt may further comprise an eye for facilitating attachment of a specialty tool used for installation.

\* \* \* \* \*